United States Patent

[11] 3,563,516

| [72] | Inventor | William Paul White<br>Whitby, England |
|---|---|---|
| [21] | Appl. No. | 852,831 |
| [22] | Filed | Aug. 25, 1969 |
| [45] | Patented | Feb. 16, 1971 |
| [73] | Assignee | United Kingdom Atomic Energy Authority<br>London, England |
| [32] | Priority | Sept. 5, 1968 |
| [33] | | Great Britain |
| [31] | | 42369/68 |

[54] SEALS FOR ROTATABLE SHAFTS
5 Claims, 2 Drawing Figs.

[52] U.S. Cl................................................. 259/106;
277/95
[51] Int. Cl..................................................... B01f 7/00;
F16j 15/34
[50] Field of Search........................................... 259/106,
107, 108; 277/81, 95

[56] References Cited
UNITED STATES PATENTS

| 2,678,837 | 5/1954 | Griefen ......................... | 277/95 |
| 3,233,837 | 2/1966 | Haber et al. .................. | 259/107X |
| 3,425,754 | 2/1969 | Artman ......................... | 277/95 |

Primary Examiner—William F. O'Dea
Assistant Examiner—Robert I. Smith
Attorney—Larson, Taylor and Hinds ABSTRACT: A seal between a shaft and a housing relative to which the shaft is rotatable comprises a resilient washer one of whose two peripheral edges is fixed fluid-tightly to the shaft or the housing the other edge being in rotatable contact with the housing or the shaft. The longitudinal axis of the washer is disposed parallel to, but is offset from, the axis of rotation of the shaft.

PATENTED FEB 16 1971 3,563,516

SEALS FOR ROTATABLE SHAFTS

BACKGROUND OF THE INVENTION

This invention relates to seal assemblies for rotatable shafts.

A known seal for a shaft member adapted for rotation is an opening in a housing member comprises a dished annular resilient washer defining an inner and an outer peripheral edge, said inner peripheral edge being mountable about the shaft member, means whereby one of said peripheral edges can be maintained in rotatable fluid-tight sealing contact with one of said members, means whereby the other of said peripheral edges is associated in fluid-tight sealing contact with the other of said members, the resilience of said washer acting to retain said rotatable sealing contact with the respective member. Such a seal is hereinafter termed "of the type described."

SUMMARY OF THE INVENTION

According to the present invention in a seal assembly of the type described the longitudinal axis of the dished annular resilient washer is disposed parallel to, but is offset from, the axis of rotation of the shaft.

By means of this offset or eccentric disposition of the washer, during relative rotation of said members, there is effected relative lateral movement between the peripheral edge of the washer and the annular face with which the said edge is maintained in rotatable fluid-tight sealing contact. Furthermore the eccentric disposition ensures that wear caused by rubbing between these contacting parts is spread over a wider area than is the case where the washer of the seal ——is disposed coaxially with the rotating member.

DESCRIPTION OF THE DRAWINGS

An embodiment of the invention will now be described by way of example with reference to the accompanying drawings of which

DESCRIPTION OF THE PREFERRED EMBODIMENT

Figure 1:
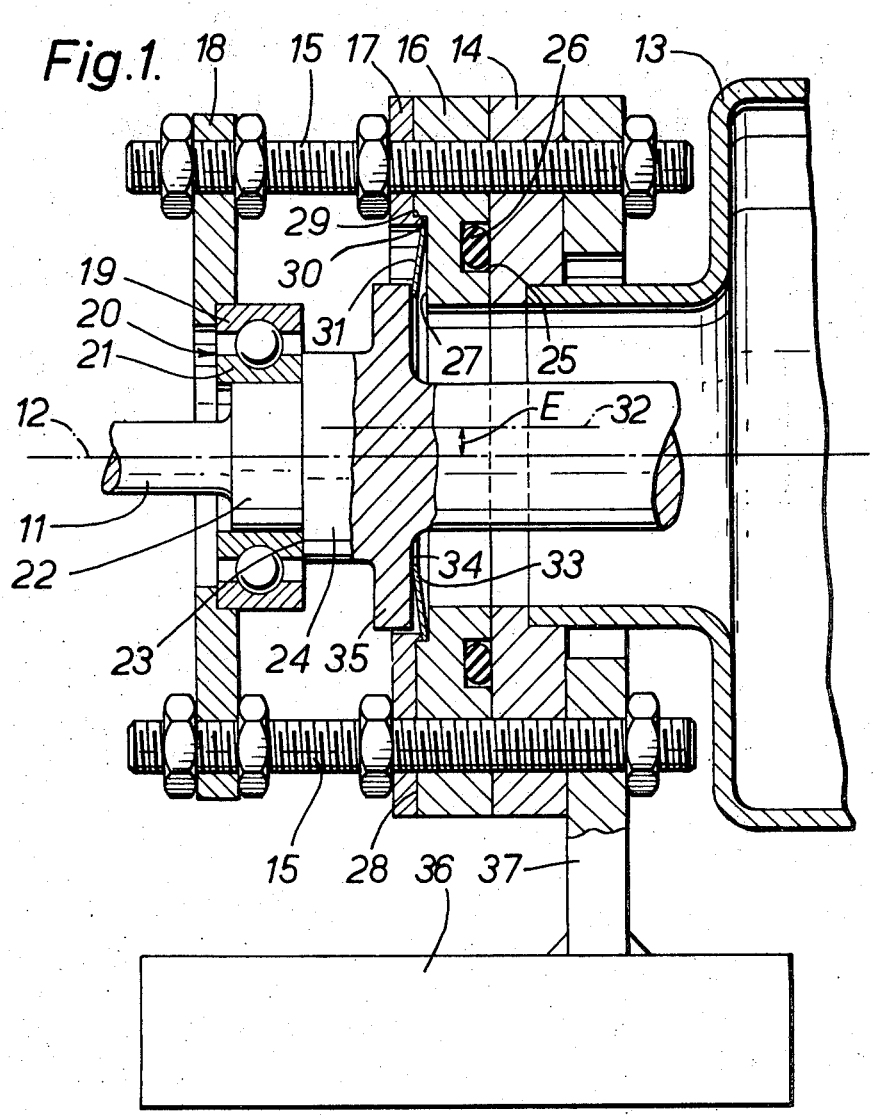
FIG. 1 is a side view in medial section of a shaft seal.

FIG. 1 shows a seal for a shaft member embodied by shaft 11, which has a longitudinal axis 12. The shaft 11 is mounted for rotation in a housing member embodied by housing 13, part only being shown, which encloses mixing hooks (not shown) for plastic material. The housing 13 has a flange 14 to which are secured against rotation by six threaded studs 15 (of which only two are shown) a spacing flange 16, a retainer 17 and a bearing support 18. The studs 15 secure the flange 14 to an apertured lug 37 which is upstanding from and welded to a base-plate 36. The bearing support 18 retains outer race 19 of a bearing 20 whose inner race 21 is an interference fit on a first section 22 of extended diameter on shaft 11. The inner race 21 is seated against a shoulder 23 defined on the shaft 11 between first section 22 and a second section 24 of greater shaft diameter than that of first section 22.

Spacing flange 16 has a recess 25 in which is mounted a deformable O-ring seal 26. Clamping of spacing flange 16 to flange 14 causes deformation of the seal 26 to provide a fluid-tight seal between said flanges.

Figure 2:
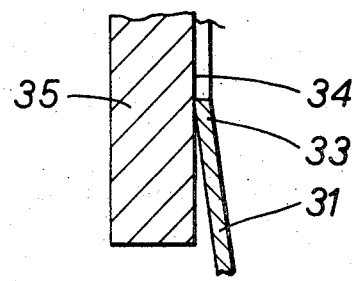
FIG. 2 is a similar view, drawn to a larger scale and illustrating a detail of FIG. 1.

Spacing flange 16 is undercut to provide a recess face 27 and an outer annular face 28 on which retainer 17 is seated. The retainer 17 is provided with a lip 29 which serves to retain against recessed face 27 outer periphery or edge 30 of a dished annular resilient washer embodied by spring washer 31. The washer 31 has a longitudinal axis 32 which is disposed parallel to, but is offset by amount E from, longitudinal axis of rotation 12 of shaft 11. Inner periphery or edge 33 of washer 31 presses against face 34 of seal flange 35 fixed to the second section 24 of shaft 11. FIG. 2 shows the region of contact between inner periphery 33 of washer 31 and the face 34 of seal flange 35. Face 34 is provided with an extremely hard (e.g. VPN 300 and smooth surface.

When shaft 11 is rotating to mix plastic material within the housing 13, plastic material fills the space therein. Leakage along paths between relatively fixed members can be prevented by conventional sealing devices. Typically O-ring seal 26 prevents plastic material leaking out of the casing 13 from between flange 14 and spacing flange 16. Plastic material tending to press out of the housing between the rotating shaft 11 and fixed spacing flange 16 acts to press inner periphery 33 of washer 31 into closer contact with face 34 of the seal flange 35. In this way outward movement of the material acts to inhibit its own further outward movement pass the inner periphery 33 of the washer 31. Furthermore by virtue of the offset, amount E, between the longitudinal axes of shaft 11 and washer 31 (respectively axes 12, 32) the inner periphery 33 of washer 31 makes an oscillatory movement across the face 34 of seal flange 35 so acting rather to wipe or scrape plastic material off the face 34. SUch movement also spreads the wearing action over a larger area than is the case with a noneccentric arrangement.

I claim:

1. A seal assembly for a shaft member adapted for rotation in an opening defined by a housing member, comprising a dished annular resilient washer defining an inner and an outer peripheral edge, said inner peripheral edge being mounted about the shaft member, means whereby one of said peripheral edges is maintainable in relative rotatable fluid-tight sealing contact with one of said members, means whereby the other of said peripheral edges is associated in fluid-tight sealing contact with the other of said members, the resilience of said washer acting to maintain said rotatable sealing contact with the respective member, the longitudinal axis of the dished annular resilient washer being disposed parallel to, but offset from, the axis of rotation of the shaft.

2. A seal assembly according to claim 1 wherein the washer is retained offset from the axis of rotation of the shaft by means of the shaft.

3. A seal assembly according to claim 1 wherein the washer is retained offset from the axis of rotation of the shaft by means of the housing member.

4. A seal assembly according to claim 3 wherein the shaft member includes a flange member defining a face against which the rotatable fluid-tight sealing contact is made said face having a surface hardness of at least VPN 300.

5. A mixing machine for plastic material having a seal according to claim 1, wherein the housing member is a mixing chamber and the shaft member carries mixing means positioned in the housing member, said washer being located at the entry of the shaft member into the housing member.